US010481946B2

(12) United States Patent
Sato et al.

(10) Patent No.: US 10,481,946 B2
(45) Date of Patent: Nov. 19, 2019

(54) INFORMATION-PROCESSING DEVICE, PROCESSING METHOD THEREOF, AND INPUT/OUTPUT DEVICE

(71) Applicant: HITACHI, LTD., Tokyo (JP)

(72) Inventors: Katsuto Sato, Tokyo (JP); Yuki Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/124,883

(22) PCT Filed: May 12, 2014

(86) PCT No.: PCT/JP2014/062550
§ 371 (c)(1),
(2) Date: Sep. 9, 2016

(87) PCT Pub. No.: WO2015/173853
PCT Pub. Date: Nov. 19, 2015

(65) Prior Publication Data
US 2017/0017516 A1    Jan. 19, 2017

(51) Int. Cl.
*G06F 13/24*   (2006.01)
*G06F 9/48*    (2006.01)

(52) U.S. Cl.
CPC ............... *G06F 9/48* (2013.01); *G06F 13/24* (2013.01)

(58) Field of Classification Search
None
See application file for complete search history.

(56) References Cited

U.S. PATENT DOCUMENTS

| 4,807,113 A | * | 2/1989 | Matsumoto | ........... G06F 9/3016 712/210 |
| 5,530,906 A | * | 6/1996 | Cho | ......................... G06F 1/08 710/58 |
| 5,557,782 A | * | 9/1996 | Witkowski | .......... G06F 13/4243 711/167 |

(Continued)

FOREIGN PATENT DOCUMENTS

| JP | 63-047861 A | 2/1988 |
| JP | 2001-331329 A | 11/2001 |

(Continued)

*Primary Examiner* — Elias Mamo
(74) *Attorney, Agent, or Firm* — Volpe and Koenig, P.C.

(57) ABSTRACT

An information processing device for reducing the number of times of interrupt notification for notifying completion of execution of input/output instruction and lightening a load of interrupt processing is described. The information processing device prescribes that a driver checks a completion state of a preceding input/output instruction after issuance of the input/output instruction. An issuing timing of the input/output instruction is considered to be a polling timing for checking the completion state of the preceding input/output instruction. Before the input/output device transmits interrupt notification to a CPU, the input/output device sets a timer to stand by for a prescribed time. A processing unit which resets the timer and extends the standby time by a prescribed time in a case where notification that a subsequent input/output instruction is issued arrives from a driver to the input/output device during the time is additionally provided to the input/output device.

10 Claims, 14 Drawing Sheets

(56) References Cited

U.S. PATENT DOCUMENTS

| | | | |
|---|---|---|---|
| 5,588,125 A | 12/1996 | Bennett | |
| 5,761,444 A * | 6/1998 | Ajanovic | G06F 13/362 700/29 |
| 5,905,881 A * | 5/1999 | Tran | G06F 9/3861 708/233 |
| 5,961,621 A * | 10/1999 | Wu | G06F 13/1626 710/100 |
| 2002/0004889 A1 | 1/2002 | Honma et al. | |
| 2003/0126397 A1* | 7/2003 | Junge | G06F 9/342 711/200 |
| 2007/0053301 A1 | 3/2007 | Maruoka et al. | |
| 2010/0241771 A1 | 9/2010 | Nagai et al. | |
| 2010/0262738 A1* | 10/2010 | Swing | G06F 3/0613 710/260 |
| 2011/0093637 A1* | 4/2011 | Gupta | G06F 9/4812 710/263 |

FOREIGN PATENT DOCUMENTS

| | | |
|---|---|---|
| JP | 2002-023961 A | 1/2002 |
| JP | 2007-074320 A | 3/2007 |
| JP | 2009-070122 A | 4/2009 |
| JP | 2010-140239 A | 6/2010 |
| JP | 2012146150 A | 8/2012 |

* cited by examiner

Fig. 14

Terminal #1 — 400

| vector | CPU0 | CPU1 | Device |
|---|---|---|---|
| 0 | 1532 | 0 | Timer |
| 1 | 0 | 1235 | Network Card |
| 2 | 462 | 0 | Input Device |
| 10 | 302 | 0 | Input Device |
| 11 | 3863 | 0 | Network Card |
| 14 | 242 | 12350 | Timer |
| 18 | 0 | 15647 | Timer |
| 32 | 13540 | 12356 | Storage Controller (hda) |
| 33 | 15863 | 23215 | Storage Controller (hdb) |

Terminal #2 — 401

| device | read/s | write/s |
|---|---|---|
| hda | 1530 | 0 |
| hdb | 0 | 0 |
| hdc | 0 | 450 |
| hdd | 0 | 0 |
| hde | 0 | 0 | ns
INFORMATION-PROCESSING DEVICE, PROCESSING METHOD THEREOF, AND INPUT/OUTPUT DEVICE

TECHNICAL FIELD

The present invention relates to an information-processing device, and more particularly, to an input/output device connected to a computer for preventing the number of times of transmission of an interrupt signal for notifying completion of execution of input/output instruction from excessively increasing with respect to a CPU.

BACKGROUND ART

In a general input/output device, used are an interrupt notification method as a method of notifying processing completion where an input/output device actively notifies the completion to a CPU and a polling method where a CPU monitors a specific area of an input/output device at certain time intervals.

The former has an advantage in that a time taken for input and output is allowed to be short because, in a case where there is no input/output processing, a processing time of the CPU is not consumed and, immediately after the input/output processing is completed, the CPU executes completion processing.

On the other hand, the latter has an advantage in that, even in a case where the number of times of input and output is large, processes other than the process executed on the CPU are not interrupted, and completion processing can be executed with a certain load.

In a general OS, since a plurality of devices simultaneously operate, used is the interrupt notification method where, in a case where there is no processing, the processing time of the CPU is not consumed. However, in the interrupt notification method, if the number of times of input and output is increased, the frequency of interrupt notification is excessively increased in the CPU, and particularly, in an apparatus having a high performance of input and output, the interrupt notification method causes the highest performance to reach a limit point. For this reason, in a case where the frequency of interrupt notification is likely to be excessively increased, there is a need to suppress the frequency.

Patent Document 1 discloses a technique of imposing restriction condition to operations of a host side to delay transmission of interrupt notification for a certain time at the time of occurrence of a specific event. In Patent Document 1, the event as a chance to delay is a time of packet reception by a device and a time of transmission of received packet processed by the CPU. In addition, Patent Document 1, the to-be-suppressed interrupt signal is an interrupt signal for transmission completion checking request for a packet signal.

CITATION LIST

Patent Document

Patent Document 1: US 2011/0093637

SUMMARY OF THE INVENTION

Problems to be Solved by the Invention

In Patent Document 1, there is no consideration of a problem of the time when the CPU issues input/output instruction to a device.

Although interrupt notification is a method generally used for an input/output device to request the CPU to perform a process in an on-demand manner, interrupt processing causes a non-negligible load in the CPU. As the performance of the input/output device is increased, the number of processable input/output instructions per unit time has been increased. Therefore, since the number of times of interrupt notification for notifying completion of execution of input/output instruction has also been increased, the load of interrupt processing has become large enough to influence the performance of input and output.

The present invention is to provide an information processing device reducing the number of times of interrupt notification for notifying completion of execution of input/output instruction to reduce a load of interrupt processing.

Solutions to Problems

According to the present invention, there is provided an information processing device having a processor, a storage unit, and an input/output device which receives an instruction of processing from the processor, wherein the information-processing device checks based on the instruction from the processor whether a preceding process is completed at the time of processing instruction from the processor, and wherein the input/output device includes: an interrupt notification transmission unit which transmits an interrupt signal as notification of processing completion to the processor; a standby unit which allows transmission of notification of the processing completion to the processor to be on standby for a certain time; and an extending unit which further extends the certain time when the transmission to the processor is allowed to be on standby in a chance of detecting a processing start instruction from the processor.

Effects of the Invention

According to the present invention, it is possible to reduce the number of times of interrupt notification for notifying completion of execution of input/output instruction to reduce a load of interrupt processing.

BRIEF DESCRIPTION OF THE DRAWINGS

FIG. 14 is a diagram illustrating an example of a statistic information display screen of an OS.

MODE FOR CARRYING OUT THE INVENTION

Figure 1:
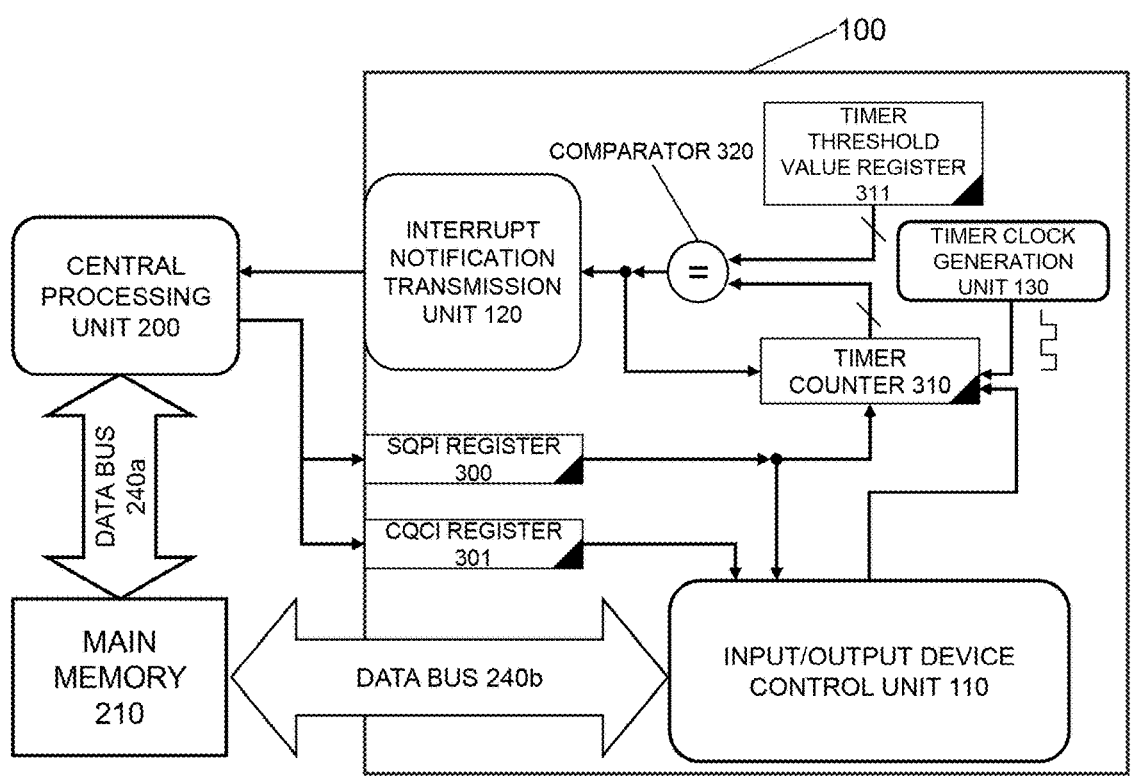
FIG. 1 is a schematic diagram illustrating an input/output device according to a first embodiment of the invention.

Hereinafter, embodiments will be described with reference to the drawings.

The present invention prescribes that driver software 201 necessarily checks a completion state of a preceding input/output instruction after issuance of the input/output instruction. Namely, an issuing timing of the input/output instruction is considered to be a polling timing for checking the completion state of the preceding input/output instruction.

Before the input/output device transmits interrupt notification to a CPU, the input/output device sets a timer to stand by for a prescribed time. A processing unit which performs an operation of resetting the timer and extending the standby time by a prescribed time in a case where notification that a subsequent input/output instruction is issued arrives from a driver to the input/output device during the time is additionally provided to the input/output device. In the following description, reference numerals of components are denoted in brackets after words representing the components in the figures. In addition, in a case where a plurality of the same components exist and there is need to distinguish the components, alphabets are added after the reference numerals of the components.

Essential components constituting the present invention are a central processing unit 200, a main memory 210, an input/output device 100, and signal lines and data buses 240 connecting these components. The input/output device 100 is provided with registers 300, 301, 310, and 311 having functions of storing data, detecting write and read to notify to an outside.

First Embodiment

One of best exemplary embodiments of the present invention is illustrated in FIG. 1. An overview of main operations of the present invention is described with reference to FIG. 1.

When there occurs a need to issue interrupt notification, the input/output device control unit 110 instructs the timer counter 310 to start the count. In a case where the count has already been started, the timer counter 310 neglects the count start instruction from the input/output device control unit 110. The timer counter 310 adds the value of the counter by 1 at every time when a clock signal issued at a certain time interval from the timer clock generation unit 130 arrives.

The comparator 320 compares a value of the timer counter 310 with a value of a timer threshold value register 311 by the comparator 320. If the two values match with each other, an instruction for the interrupt notification transmission unit 120 to transmit interrupt notification to the CPU 200 is issued. At the same time, the value of the timer counter 310 is reset to stop addition of the count.

When receiving the transmission instruction, the interrupt notification transmission unit 120 transmits the interrupt notification to the central processing unit 200.

When the central processing unit 200 performs writing in the SQPI register 300 in order to notify the issuance of the input/output instruction to the input/output device 100, the SQPI register notifies the writing to the input/output device control unit 110 and resets the value of the timer counter 310. The SQPI register is an abbreviation of a submission queue producer Index register and is a register for notifying issuance of an input/output instruction from the CPU to the input/output device. However, a signal outgoing from the SQPI register 300 to the timer counter 310 does not stop addition of the timer counter 310.

The operations described heretofore are basic operations at the time of suppressing the number of times of interrupt notification. Each of the above-described operations will be described more in detail.

Figure 2:
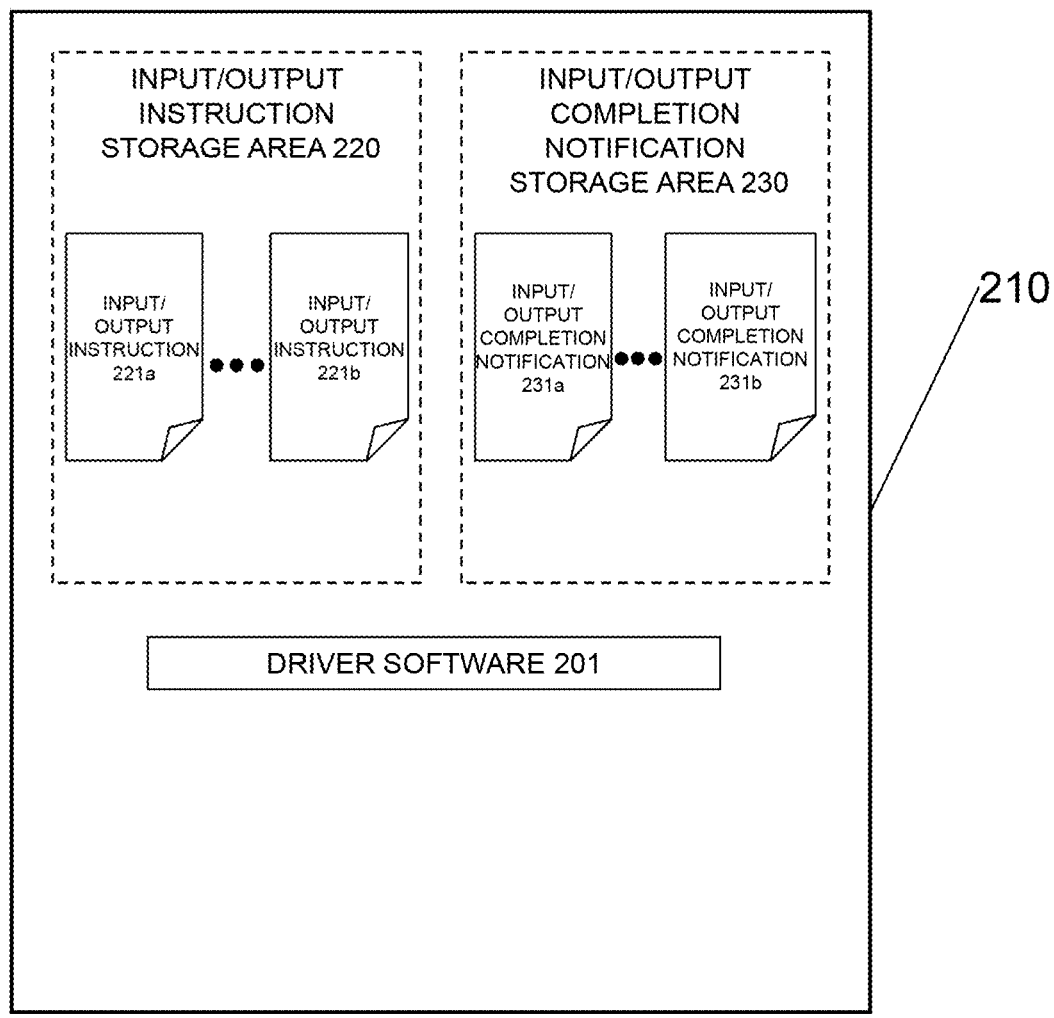
FIG. 2 is a schematic diagram illustrating an input/output instruction storage area and an input/output completion notification storage area on a main memory.
Figure 3:
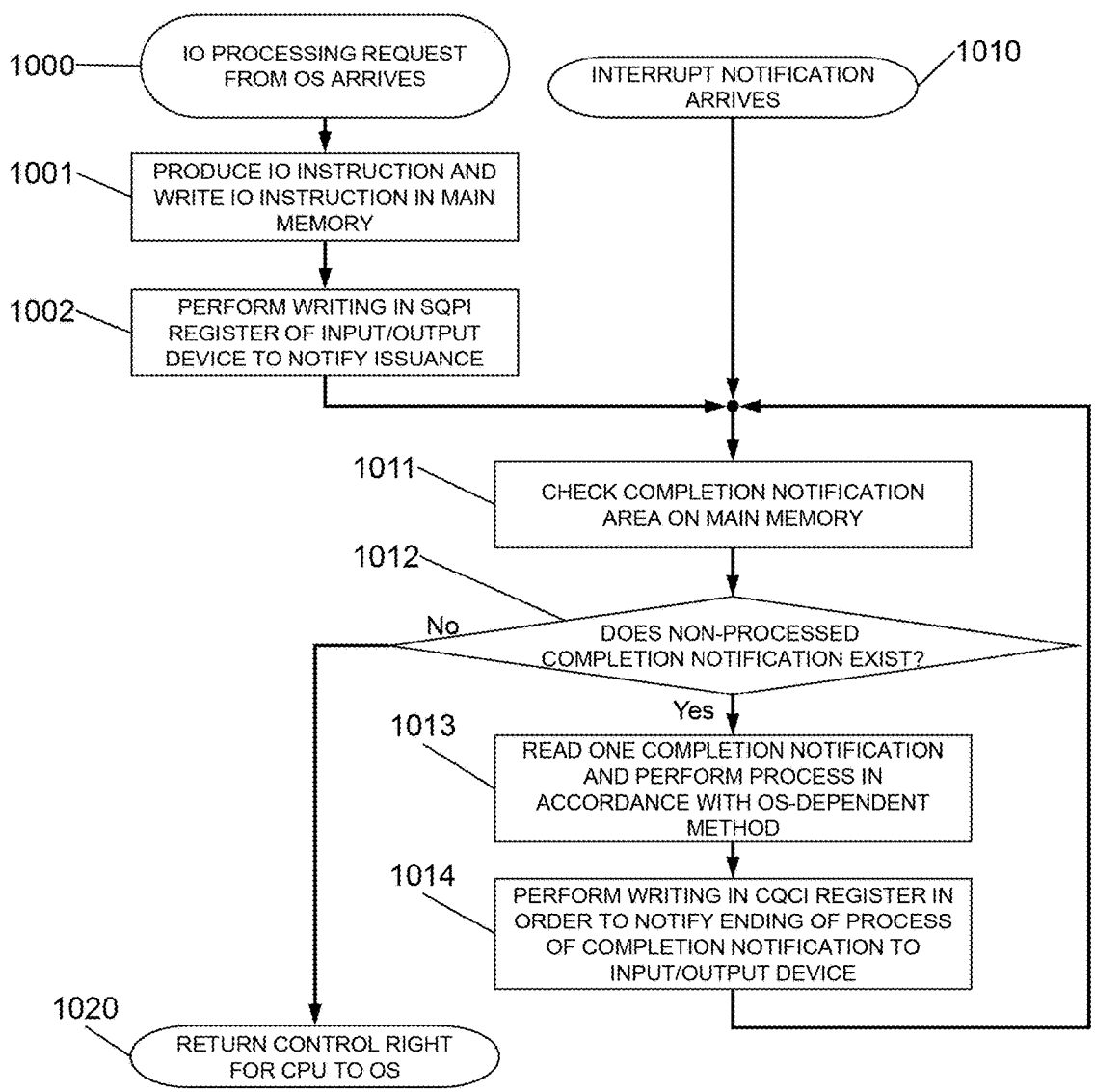
FIG. 3 is a diagram illustrating an operation sequence of driver software.

The operations of the driver software 201 will be described with reference to FIGS. 2 and 3. The driver software 201 start processing from the time when an input/output processing request from the OS arrives and the control right of the CPU 200 is given or from the time when the interrupt notification arrives. The numbers written in front of the description of the operations described below correspond to reference numerals in the figures. In the below description of the operation sequence of the driver software 201, described are the operations that the CPU 200 reads the driver software 201 stored in the main memory 210 and executes functions of the driver software 201.

(1000) The input/output processing request arrives from the OS, and and the control right of the CPU 200 is given.

(1001) The input/output instruction 221 is produced, and the input/output instruction is written in a specific area 220 allocated in the main memory 210.

(1002) Writing in the SQPI register 300 is performed in order to notify issuance of a new instruction to the input/output device 100. The operation sequence proceeds to a procedure (1011).

(1010) The interrupt notification arrives from the input/output device 100, the control right of the CPU is given from the OS to the driver software 201. The operation sequence proceeds to a procedure (1011).

(1011) The storage area 230 storing the input/output completion notification secured on the main memory 210 is checked.

(1012) In a case where a non-processed input/output completion notification 231 exist in the completion notification storage area 230 on the main memory 210, the operation sequence proceeds to a procedure (1103). In a case where the non-processed input/output completion notification 231 does not exist, the operation sequence proceeds to a procedure (1020).

(1013) One of the non-processed completion notifications 231 stored in the input/output completion notification storage area 230 on the main memory 210 is read, and completion processing is performed according to an OS-dependent method.

(1014) Writing in a CQCI register 301 of the input/output device 100 is performed, and completion of processing of the completion notification 231 is notified to the input/output device 100. The operation sequence proceeds to a procedure (1011). The CQCI register is an abbreviation of a completion queue consumer index register and is a register for notifying the completion of processing of the completion notification from the input/output device with respect to the input/output instruction from the CPU to the input/output device.

(1020) The control right of the CPU 200 is returned to the OS.

The operations of the input/output device control unit 110 will be described with reference to FIGS. 2 and 4.

(1100) Writing in the SQPI 300 register from the CPU 200 is detected.

(1101) One input/output instruction 221 is read from the input/output instruction storage area 220 allocated in the main memory 210.

(1102) The input/output instruction 221 is processed.

(1103) If the input/output processing is completed, The operation sequence proceeds to a procedure (1104). In a case where the input/output process is not completed, the procedure (1103) is repeated.

(1104) The input/output completion notification 231 is produced.

(1105) If there is an empty space in the input/output completion notification storage area 230, the operation sequence proceeds to a procedure (1106). If there is no empty space, the operation sequence proceeds to a procedure (1120).

(1106) The input/output completion notification 231 is written in the empty space of the input/output completion notification storage area 230 allocated in the main memory 210.

(1107) A counter addition start instruction is sent to the timer counter 310.

(1108) The input/output processing is completed.

(1120) Standby is maintained until completion processing by the CPU 200 for the completion notification storage area 230 is ended. The operation sequence proceeds to a procedure (1105).

(1130) The writing in the CQCI register 301 from the CPU 200 is detected.

(1131) The area, that the completion notification 231 processed by the CPU 200 is stored, is deallocated.

(1132) In a case where the non-processed completion notification 231 exists in the completion notification storage area 230, the operation sequence proceeds to a procedure (1134). In a case where the non-processed completion notification 231 does not exist, the operation sequence proceeds to a procedure (1133).

(1133) The timer counter 310 is reset, and stopping the addition is instructed.

(1134) The input/output device control unit 110 complete a deallocation process for the area of completion notification 231.

Figure 5:
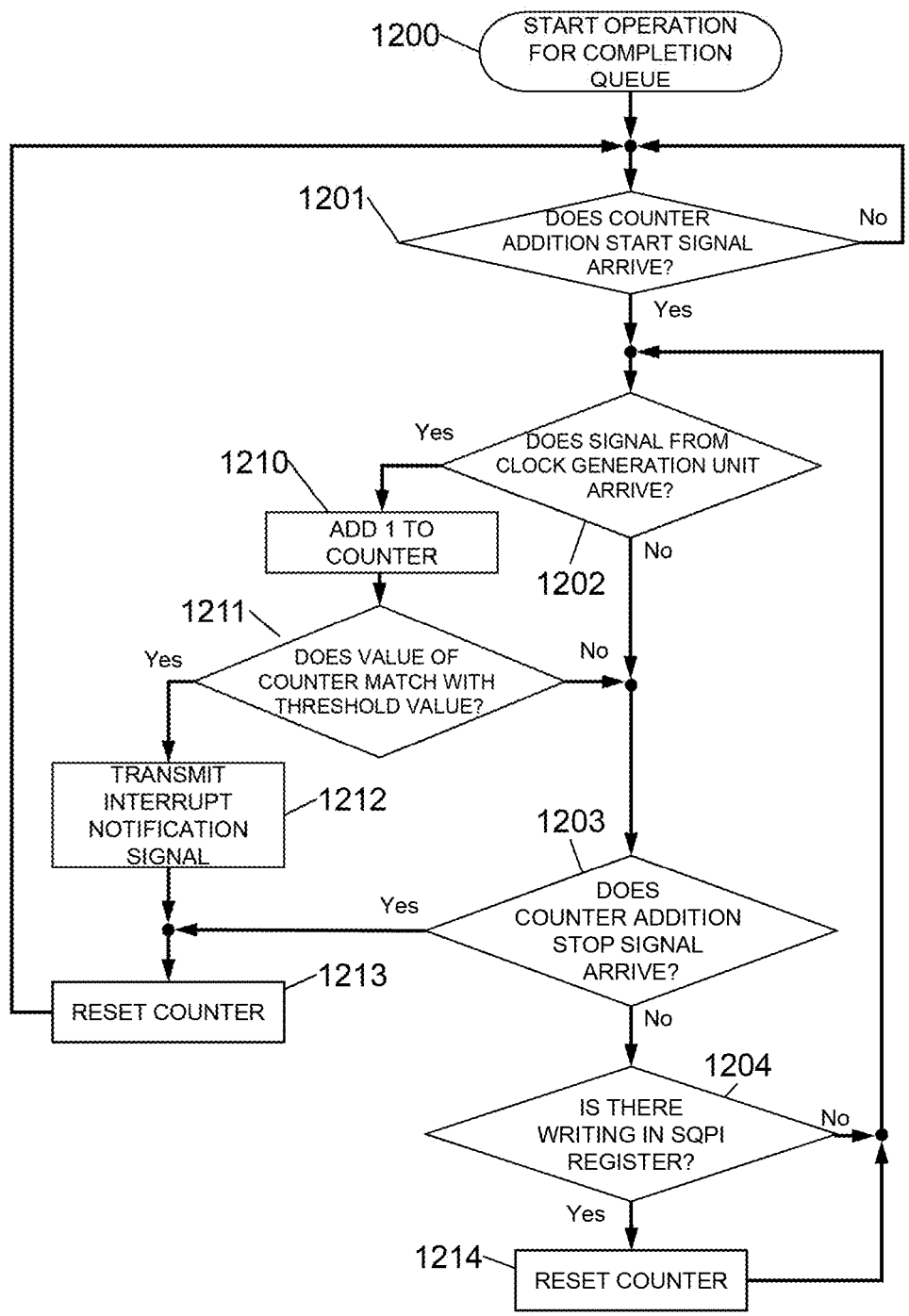
FIG. 5 is a diagram illustrating an operation sequence of an interrupt notification frequency suppressing function including a timer counter.

The entire operation sequences of the interrupt notification frequency suppressing function including the time counter 310 will be described with reference to FIGS. 1 and 5

(1200) The operation of the completion queue is started along with completion of device initialization or completion of execution of a command to setup a completion queue.

(1201) In a case where the counter addition start signal arrives, the operation sequence proceeds to a procedure (1202). In a case where the counter addition start signal does not arrive, the procedure (1201) is repeated.

(1202) In a case where a signal arrives from the clock generation unit 130, the operation sequence proceeds to a procedure (1210). In a case where the signal does not arrive, the operation sequence proceeds to a procedure (1203).

(1203) In a case where a counter addition stop signal arrives, the operation sequence proceeds to a procedure (1213). In a case where the counter addition stop signal does not arrive, the operation sequence proceeds to a procedure (1204).

(1204) In a case where there is writing in the SQPI register 300, the operation sequence proceeds to a procedure (1214). In a case where there is no writing, the operation sequence proceeds to a procedure (1202).

(1210) The timer counter 310 is added by 1.

(1211) In a case where the value of the timer counter 310 matches with the threshold value register 311, the operation sequence proceeds to a procedure (1212). In a case where the value of the timer counter does not match with the through-hole register, the operation sequence proceeds to a procedure (1203).

(1212) An interrupt notification signal is transmitted to the CPU 200.

(1213) The timer counter 310 is reset. The operation sequence proceeds to a procedure (1201).

(1214) The timer counter is reset. The operation sequence proceeds to a procedure (1202).

According to the embodiment, it is possible to suppress the frequency of interrupt notification by using only the interrupt notification in comparison with the case of notifying the completion of the input/output processing. Particularly, in a case where the input/output instructions are issued from the driver at an interval shorter than a predetermined standby time, the transmission of the interrupt notification can be always delayed, and the input/output processing can be performed without transmitting the interrupt notification. Therefore, in the state that the input/output instruction is processed at a high frequency which is a problem in terms of a load of interrupt processing in the related art, the input/output operation can be completed without performing the interrupt processing.

In addition, although the value of the standby time influences on a delay time of an input/output processing, in the present invention, since it is possible to obtain a large effect when the standby time is longer than the issuing interval of the input/output processing. Therefore, if the standby time is set to a small value by targeting the high-load case, it is possible to minimize the demerit in delay time of the an input/output processing.

Second Embodiment

An example where the present invention is implemented by using a plurality of independent input/output instruction storage area 220 and input/output completion notification storage area 230 between the CPU 200 and the input/output device 100. In addition, the number of the input/output instruction storage areas 220 and the number of the input/output completion notification storage areas 230 may not match with each other. Hereinafter, the input/output instruction storage area 220 is referred to as an submission queue, and the input/output completion notification storage area 230 is referred to as a completion queue.

Figure 6:
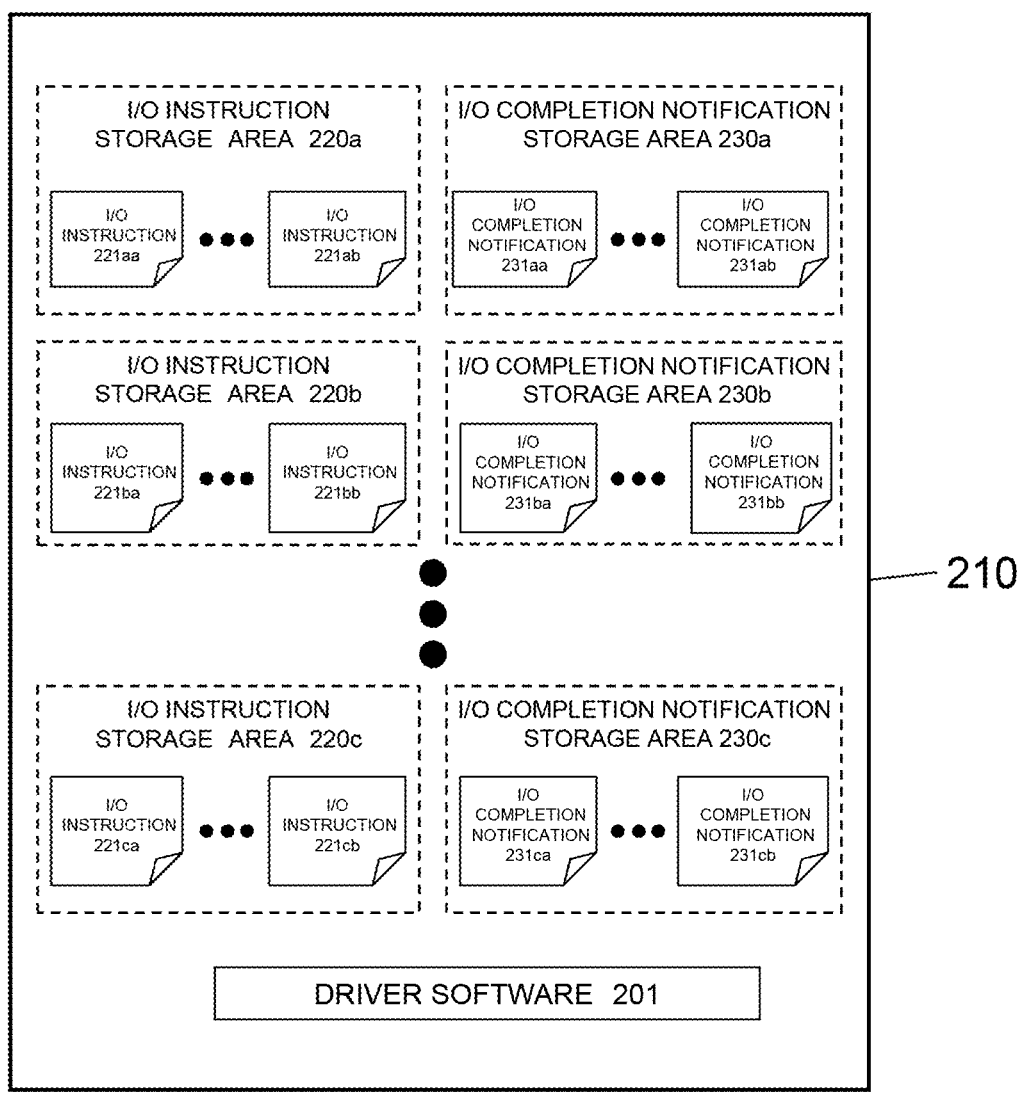
FIG. 6 is a diagram illustrating a state where a plurality of input/output instruction and completion notification storage areas are arranged in a main memory.
Figure 7:
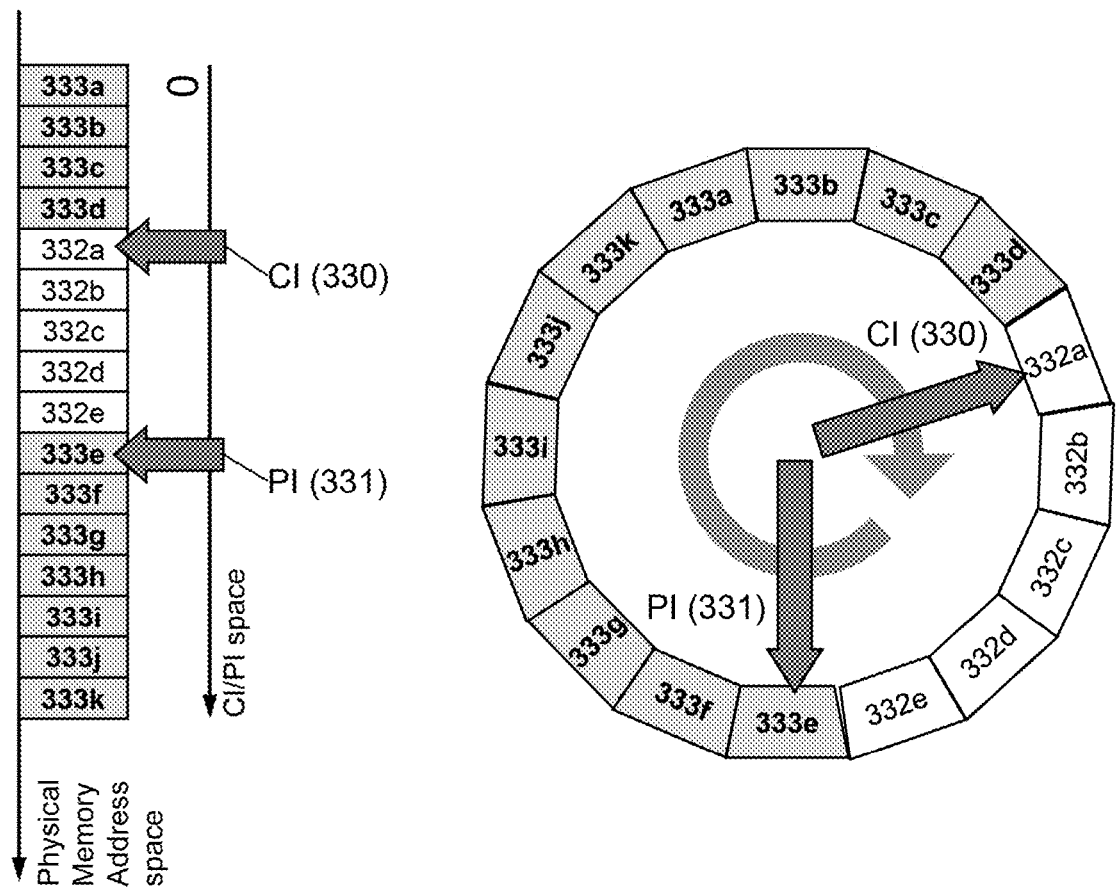
FIG. 7 is a schematic diagram illustrating a structure of submission queue and completion queue.

The state that a plurality of submission queues 220 and a plurality of completion queues 230 exist in the main memory 210 is illustrated in FIG. 6. With respect to the submission queue and the completion queue, invalid areas and valid areas are continuously arranged in a logic number space, boundaries thereof are indicated by PIs 331 or CIs 330, and a start point and an end point are connected to each other, so that a circulation boundary condition is satisfied. Therefore, the submission queue and the completion queue are configured with a ring buffer as illustrated in FIG. 7. The PI 331 and the CI 330 exist in both of the submission queue 220 and the completion queue 230, respectively. Among the four pointers, the PI 331 of the submission queue 220 are stored in the SQPI 300 in the input/output device, and the CI 331 of the completion queue 230 are stored in the CQCI 301 in the input/output device. The other pointers are arranged at appropriate positions on the main memory 210.

From which completion queue 230 the completion notification 231 corresponding to the input/output instruction 221 inserted into which submission queue 220 is received is designated by the driver software 201 to the input/output device 100 at the time of initialization of the input/output device 100 or is designated by a management command at the time of instructing starting of operation of the submission queue 220 to the input/output device 100.

In case of requesting the CPU 200 to perform the processing of the completion notification 231 in an interrupt manner, the input/output device 100 uses MSI (Message Signaled Interrupts) or MSI-X (Message Signaled Interrupts extended) defined in accordance with a PCI-express standard (PCI express is a trade mark of Peripheral Component Interconnect Special Interest Group (PCI-SIG)) so that the CPU 200 can uniquely determine the completion queue 230 of which processing is needed. The MSI and MSI-X have a mechanism where occurrence of an interrupt processing request by the input/output device 100 performing an operation of writing in a specific memory address set by the CPU 200 side is transmitted to the CPU 200, and if the address of writing site is allowed to be different, the CPU 200 can identify that the interrupt processing request occurs due to a different factor. Since the MSI/MSI-X interrupt merely has a difference in a memory address of a writing site, although the number of interrupt factors is increased, the number of physical wire lines is not increased.

In the embodiment, the MSI number or MSI-X number used by the completion queue 230 in the case of requesting the interrupt processing is designated by the driver software 201 at the time of initialization of the input/output device 100 or is designated by a management command at the time of instructing starting of operation of the completion queue 230 to the input/output device 100. In addition, an MSI/MSI-X number register 303 for storing the information is arranged inside the input/output device 100.

Figure 8:
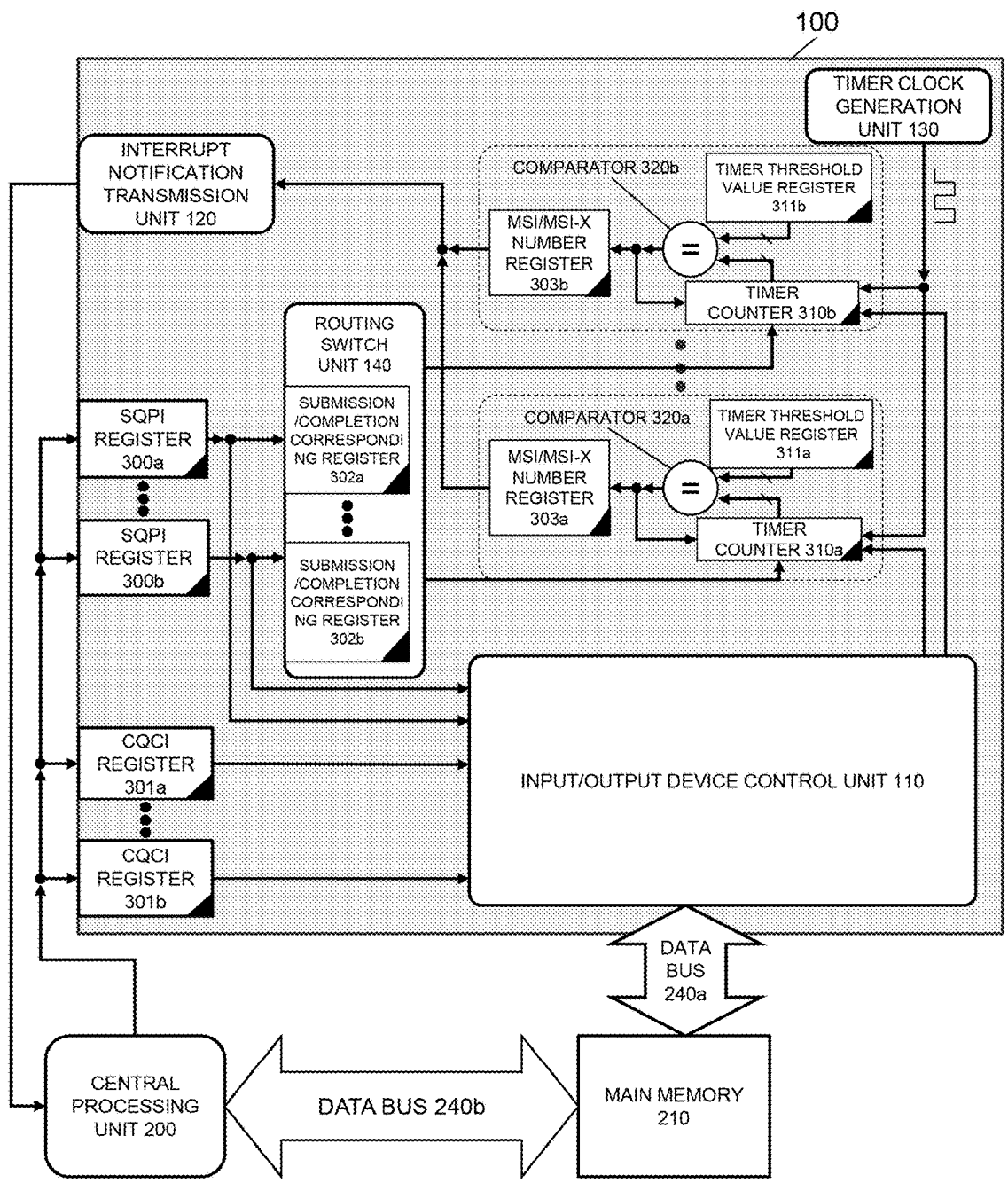
FIG. 8 is a schematic diagram illustrating an input/output device according to a second embodiment of the invention which handles a plurality of submission queues and completion queues.

A schematic diagram of the input/output device 100 handling a plurality of the submission queues 220 and a plurality of the completion queues 230 is illustrated in FIG. 8. In the embodiment, timer counters 310a and 310b, threshold value registers 311a and 311b, MSI/MSI-X number registers 303a and 303b, and comparators 320a and 320b for each completion queue are installed.

The information corresponding to the submission queue 220 and the completion queue 230 is stored in submission/completion corresponding registers 302a and 302b, and a routing switch unit 140 for the reset signal of the timer counter 310 transmits the reset signal to the timer counter 310 of an appropriate completion queue based on the information.

When the value of the timer counter reaches a threshold value and the interrupt notification is transmitted, the interrupt number is transmitted to the interrupt notification transmission unit 120 by referring to the MSI/MSI-X number register 303 storing a vector number of the MSI or MSI-X which is to be used by the completion queue. By performing the operation of writing in a specific memory address calculated based on the interrupt number designated by the interrupt notification transmission unit 120 the interrupt notification is transmitted to the CPU 200.

Figure 9:
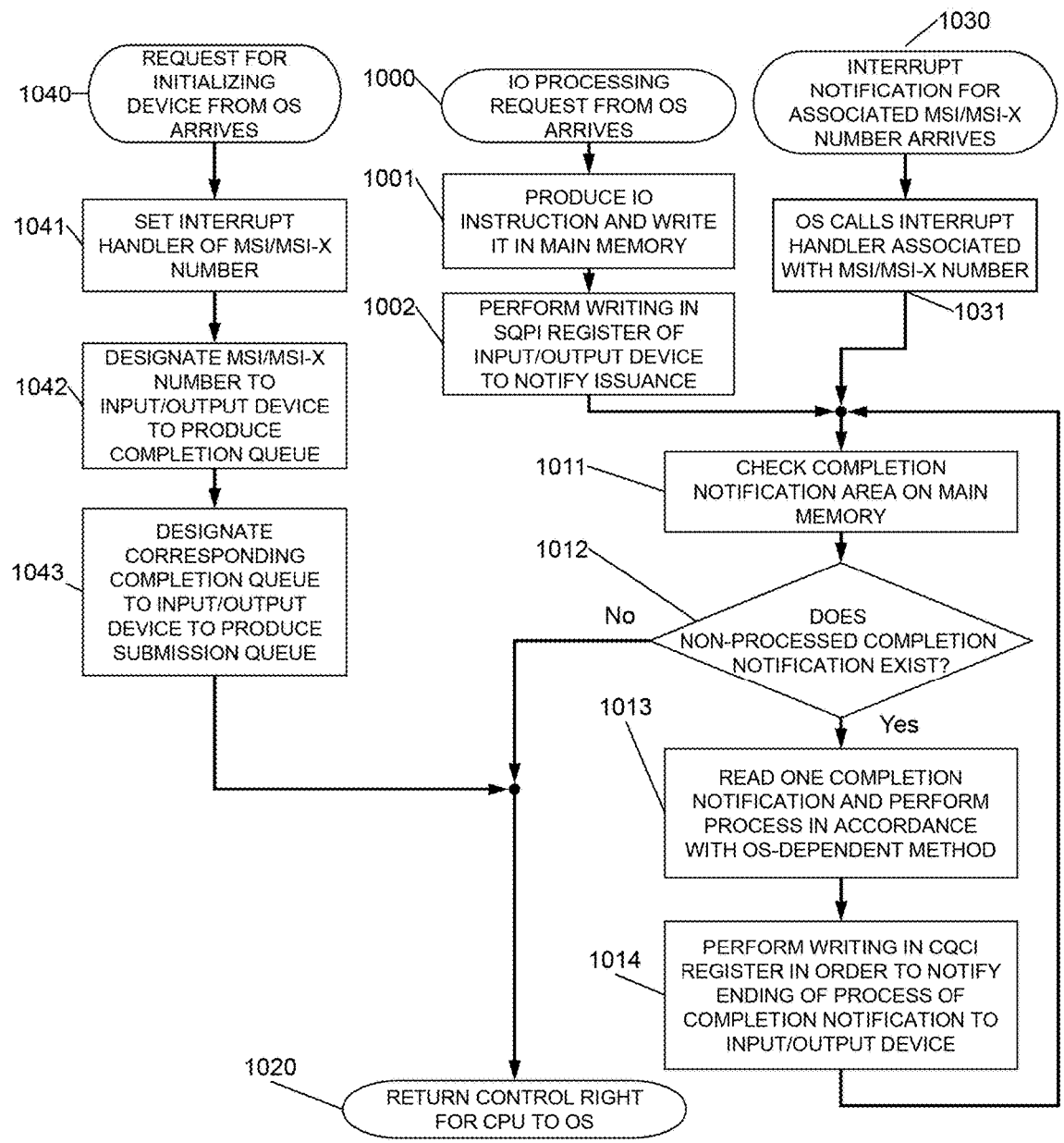
FIG. 9 is a diagram illustrating an operation sequence of driver software in a case where a plurality of queues exist.

The behavior of the driver software 201 in a case where a plurality of the submission queues 220 and a plurality of the completion queues 220 exist will be described with reference to FIG. 9. The sequence includes a portion of behavior of the OS.

(1000) The input/output processing request arrives from the OS, and the control right of the CPU 200 is given.

(1001) The input/output instruction 221 is produced, and the input/output instruction is written in a specific area 220 secured in the main memory 210.

(1002) Writing in the SQPI register 300 is performed in order to notify issuance of a new instruction to the input/output device 100. The operation sequence proceeds to a procedure (1011).

(1030) The interrupt notification with respect to a specific MSI number or a specific MSI-X number arrives from the input/output device 100.

(1031) The OS calls interrupt processing function (handler) corresponding to the MSI number or the MSI-X number designated as the interrupt notification. The operation sequence proceeds to a procedure (1011).

(1011) The storage area 230 storing the input/output completion notification allocated on the main memory 210 is checked.

(1012) In a case where a non-processed input/output completion notification 231 exist in the completion notification storage area 230 on the main memory 210, the operation sequence proceeds to a procedure (1103). In a case where the non-processed completion notification 231 does not exist, the operation sequence proceeds to a procedure (1020).

(1013) One of the non-processed completion notifications 231 stored in the completion notification area 230 on the main memory 210 is read, and completion processing is performed according to an OS-dependent method.

(1014) Writing in a CQCI register 301 of the input/output device 100 is performed, and completion of processing of the completion notification is notified. The operation sequence proceeds to a procedure (1011).

(1040) The request of initialization of the input/output device 100 arrives from the OS to the driver software 201.

(1041) The driver software 201 allocates the MSI number or the MSI-X number and sets the interrupt processing function (handler) in association with the allocated number.

(1042) The input/output device 100 is designated with the MSI number or the MSI-X number, a management command of producing the completion queue 230 is transmitted, and the completion queue 230 is produced.

(1043) The input/output device is designated with the corresponding completion queue 230 number, a management command producing the submission queue 220 is transmitted, and the submission queue 220 is produced. The operation sequence proceeds to a procedure (1043).

(1020) The control right of the CPU 200 is returned to the OS.

Figure 4:
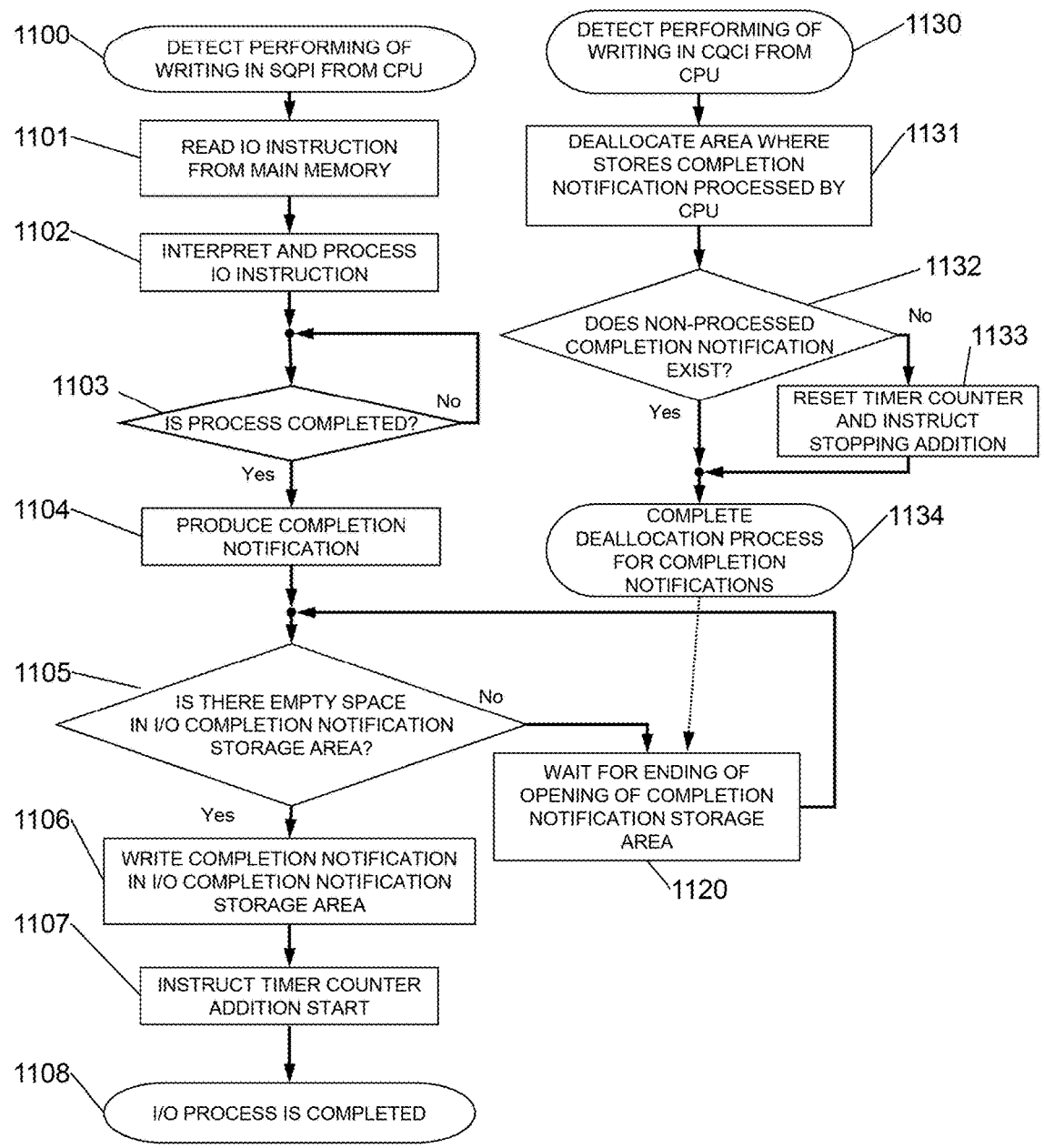
FIG. 4 is a diagram illustrating an operation sequence of an input/output device control unit.

The sequence of the input/output device control unit 110 is not changed from FIG. 4. However, there is a difference in terms that the timer counter 310 as an object of control in the operation sequence proceeds to a procedure (1107) and the operation sequence proceeds to a procedure (1133) becomes an object which can be associated with the completion queue 230 where the input/output completion notification 231 is arranged.

In addition, with respect to a plurality of the submission queues 220, in the procedures of FIG. 4, a plurality of the control units 110 executing the input/output processing may operate in parallel. In a case where a plurality of the control units process the submission queue in parallel, the timer counter 310 which becomes an object of transmitting the start signal or the reset signal of the timer is only included in the completion queue 230 associated with the submission queue 220.

Figure 10:
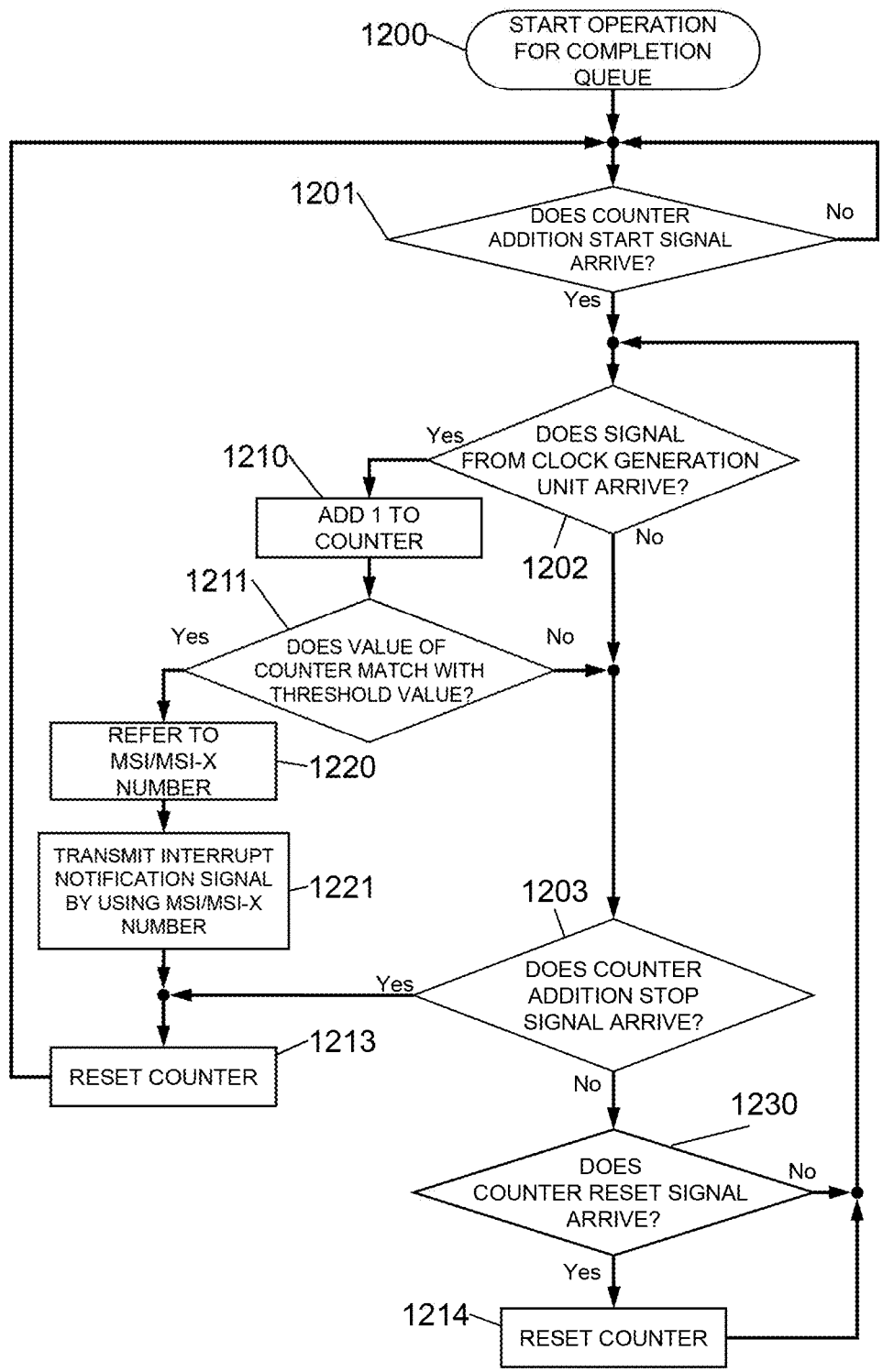
FIG. 10 is a diagram illustrating an operation sequence (1) of an interrupt notification frequency suppressing function including a timer counter in a case where a plurality of queues exist.

The operation sequence of the interrupt notification frequency suppressing function in a case where a plurality of the queues exist is described with reference to FIG. 10. FIG. 10 illustrates the operation sequence performed for every completion queue.

(1200) The operation of the completion queue is started along with completion of initialization or completion of execution of a command of producing a completion queue.

(1201) In a case where the counter addition start signal arrives, the operation sequence proceeds to a procedure (1202).

In a case where the counter addition start signal does not arrive, the procedure (1201) is repeated.

(1202) In a case where a signal arrives from the clock generation unit 130, the operation sequence proceeds to a procedure (1210). In a case where the signal does not arrive, the operation sequence proceeds to a procedure (1203).

(1203) In a case where a counter addition stop signal arrives, the operation sequence proceeds to a procedure (1213). In a case where the counter addition stop signal does not arrive, the operation sequence proceeds to a procedure (1230).

(1210) The timer counter 310 is added by 1.

(1211) In a case where the value of the timer counter 310 matches with the threshold value register 311, the operation sequence proceeds to a procedure (1220). In a case where the value of the timer counter does not match with the threshold value register, the operation sequence proceeds to a procedure (1203).

(1213) The timer counter 310 is reset. The operation sequence proceeds to a procedure (1201).

(1214) The timer counter is reset. The operation sequence proceeds to a procedure (1202).

(1220) The MSI number or the MSI-X number is read from the MSI/MSI-X number register 303 to be transmitted to the input/output device control unit 110.

(1221) The input/output device control unit 110 transmits the interrupt notification to the CPU 200 by using the transmitted MSI number or MSI-X number. The operation sequence proceeds to a procedure (1213).

(1230) When the counter reset signal arrives, the operation sequence proceeds to a procedure (1214). In a case where the counter reset signal does not arrive, the operation sequence proceeds to a procedure (1202).

Figure 11:
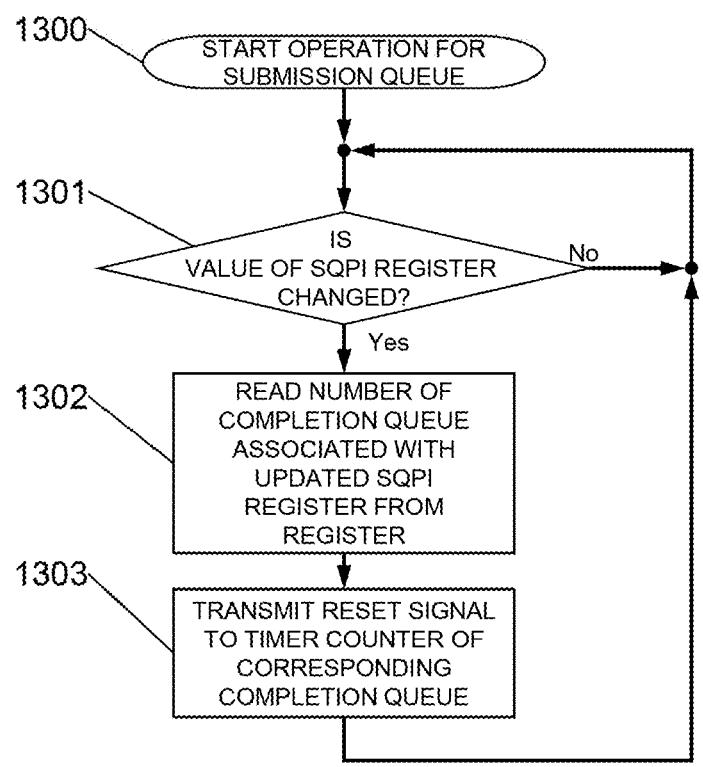
FIG. 11 is a diagram illustrating an operation sequence (2) of an interrupt notification frequency suppressing function including a timer counter in a case where a plurality of queues exist.

A flow of operation of resetting the timer counter in the chance of the writing in the SQPI register 300 will be described with reference to FIG. 11.

(1300) The operation of the submission queue 220 is started.

(1301) In a case where the value of the SQPI register 300 is changed, the operation sequence proceeds to a procedure (1302). In a case where the value is not changed, the procedure (1301) is repeated.

(1302) The number of the completion queue 230 associated with the updated submission queue 220 is read from the completion queue number register 302.

(1303) The counter reset signal is transmitted to the timer counter 310 associated with the specific completion queue 230. The operation sequence proceeds to a procedure (1301).

Figure 12:
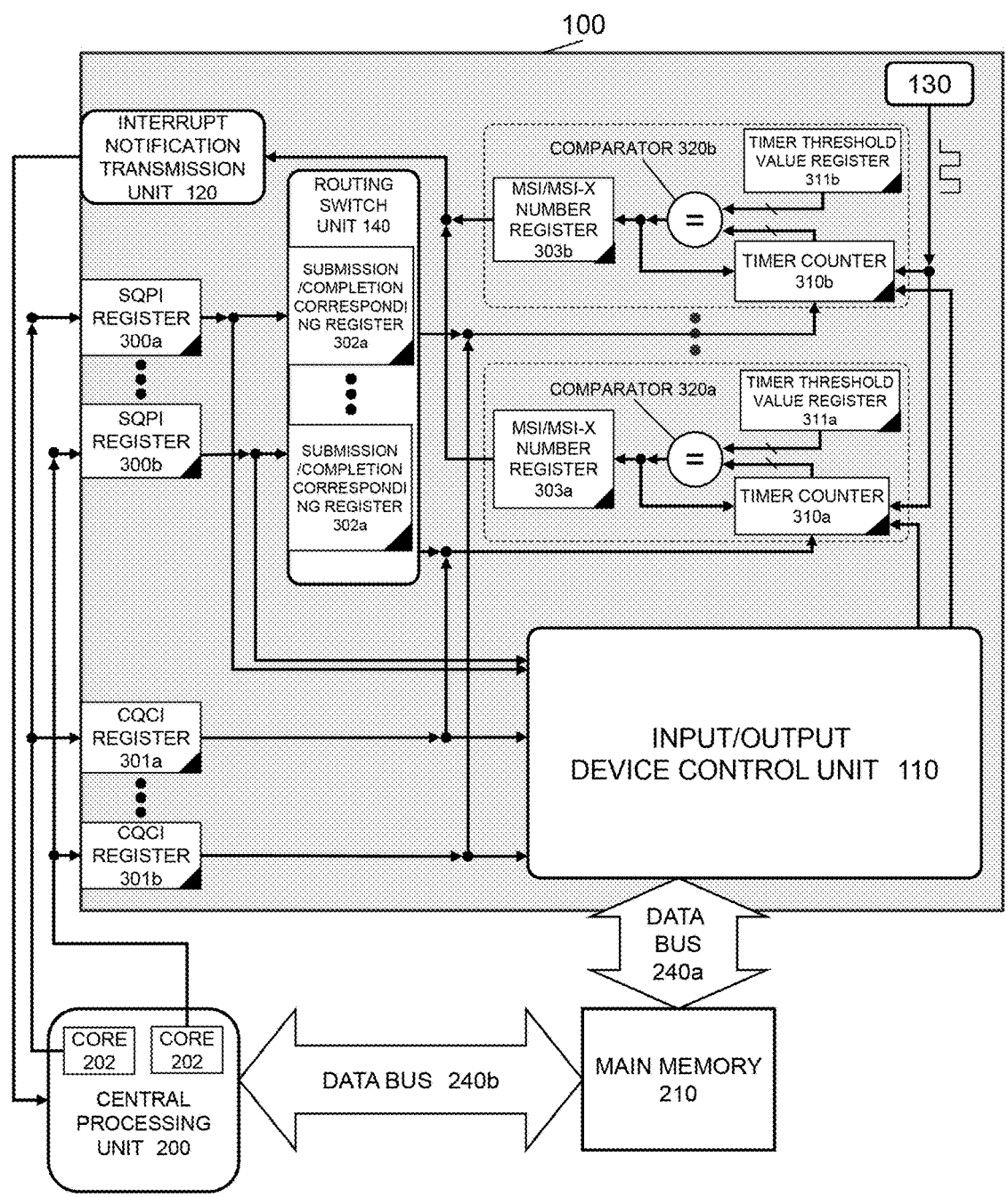
FIG. 12 is a schematic diagram illustrating an input/output device according to a third embodiment of the invention which uses a processing completion signal for completion notification to suppress a frequency of interrupt notification.

As illustrated in FIG. 12, two cores 200 constituting the central processing unit 200 are allocated to each of the SQPI register 300 and the CQCI register 301. In the second embodiment, the submission queue is allowed to correspond to the MSI number or the MSI-X number, and thus, in the case of multi-core, I/O processing is concentrated on a specific completion queue, so that bottle neck in the I/O processing is not allowed to occur.

Third Embodiment

In a case where, at the time of performing checking a state of a completion queue 230, the driver software 201 performs an operation of continuously processing the input/output completion notification 231 existing in the completion queue area 230, the CQCI register 301 for transmitting to the input/output device the message indicating that the CPU processes the completion notification existing in the completion queue area can also be used in order to delay a timing of the interrupt notification.

When the value of the CQCI 301 is updated, since there is a possibility that the input/output completion notification 231 written in the completion queue 230 is being processed immediately before the time, transmission of the interrupt notification is stopped for a certain time, so that the effect of suppressing the frequency of interrupt notification can be expected.

Since the CQCI registers 301 can be configured to be in one-to-one correspondence with the completion queues 230, if the timer counter 310 of the completion queue 230 is reset when the corresponding CQCI register is changed, the effect of delaying the transmission of the completion queue for a certain time can be obtained. An overview of hardware implementing the operations is illustrated in FIG. 12.

The flow of operations of the driver software 201 and the input/output device control unit is the same as that of the second embodiment. The sequence of FIG. 13 is added to the flow of operations of the interrupt notification frequency suppressing function.

Figure 13:
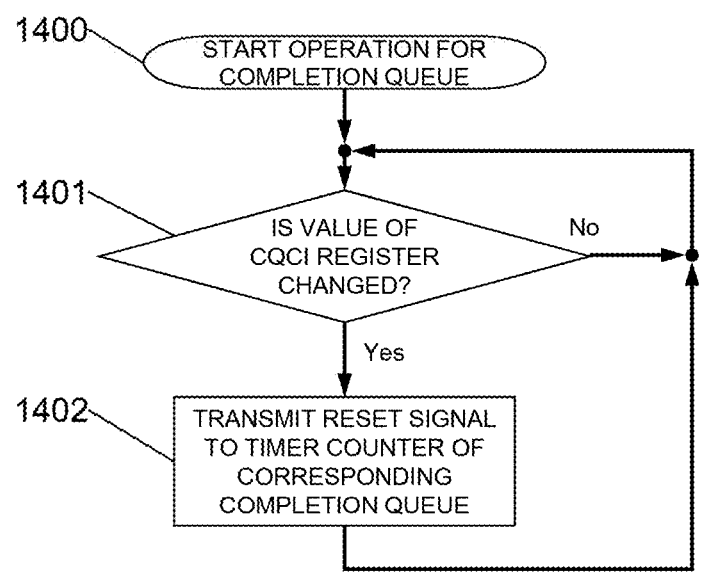
FIG. 13 is a diagram illustrating an additional operation sequence in the second embodiment when a processing completion signal for completion notification is used to suppress a frequency of interrupt notification.

The flow of the operation sequence of the timer counter resetting in the chance of updating the CQCI register is illustrated in FIG. 13.

(1400) The operation of the completion queue 230 is started.

(1401) In a case where the value of the CQCI register 301 is changed, the operation sequence proceeds to a procedure (1402). In a case where the value is not changed, the procedure (1401) is repeated.

(1402) The counter reset signal is transmitted to the timer counter 310 associated with the completion queue 230 corresponding to the CQCI register 301. The operation sequence proceeds to a procedure (1401).

According to the third embodiment, the CPU 200 reads not only one input/output completion notification 231 in one completion queue 230, but if other input/output completion notifications exist in the completion queue 230, the CPU can collectively read a plurality of the input/output completion notifications, so that it is possible to reduce a load of the CPU 200.

In the embodiment heretofore, the behaviors viewed from the OS operating on the CPU 200 are described. The behaviors of the input/output device 100 where the present invention is embodied can be obtained from the statistic information of the number of times of the input/output processing and the number of times of interrupt per unit time which are provided by the OS. For example, Linux (registered trade mark or trade mark of LinusTorvalds in USA or other nations) is equipped with an interface for acquiring the number of times of the input/output processing or the number of times of interrupt per unit time as procfs.

FIG. 14 illustrates an example of visualizing statistic information though procfs from a terminal screen of the OS. The operations of the present invention can be observed by referring to the information. The display screen 400 for statistic values of the number of times of interrupt illustrates interrupt number, number of times of interrupt for each processor, and type of device notifying interrupt from the left column. The display screen 401 for statistic values of the number of times of input/output processing illustrates device name, number of read instructions, and number of write instructions from the left column.

In the embodiment, until the number of times of input/output request reach a certain frequency, like the input/output device in the related art, the number of times of interrupt (a changed amount of 400 in FIG. 14) is proportional to the number of times of input and output per unit time (401 in FIG. 14).

If the number of times of input and output per unit time is increased to exceed a certain threshold value, the number of times of interrupt of the device corresponding to the number of times of interrupt per unit time (400 in FIG. 14) is not increased. The phenomenon is a behavior unique to the present invention and is useful for checking the embodied state of the present invention.

INDUSTRIAL APPLICABILITY

In an information-processing device including an input/output device connected to a computer, the number of times of transmission of an interrupt signal for notifying completion of execution of input/output instruction is prevented from being excessively increased in a CPU, the present invention can be widely applied to information-processing devices.

REFERENCE SIGNS LIST 100 input/output device
110 input/output device control unit
120 interrupt notification transmission unit
130 timer clock generation unit
140 routing switch unit
200 central processing unit (CPU)
210 main memory
240 data bus for reading and writing in main memory
300 SQPI register
301 CQCI register
310 timer counter
311 timer threshold value register
320 comparator

The invention claimed is:

1. An information processing device having a processor, a memory, and an input/output device which receives an a processing starting instruction from the processor and performs processing,
wherein the processor is configured to check whether a preceding processing instruction is completed by an interrupt signal from the input/output device, and dispatch the processing start instruction if a value of the preceding processing instruction which has not been completed is less than a predetermined number,
wherein the input/output device is configured to:
transmit the interrupt signal, as notification of completion of processing, to the processor;
standby for a certain period of time before a transmission of the interrupt signal as notification of completion of the processing to the processor; and
extend the certain period of time of standby for transmission of the interrupt signal to the processor when receiving the processing starting instruction from the processor during the standby for the certain period of time,
wherein the input/output device detects a plurality of the processing starting instructions in response to instructions from a plurality of the processors, and
wherein, in a case where the processing starting instruction is detected, the processor further extends the certain period of time until the notification to the processor is performed.

2. The information-processing device according to claim 1, wherein the processing starting instruction from the processor is detected by writing in a register inside the input/output device.

3. The information-processing device according to claim 2, wherein the processor is further configured to transmit the interrupt signal together with identification information identifying a plurality of processing completion queues provided in the memory.

4. The information-processing device according to claim 1, wherein, when a signal notifying that the processing completion notification from the processor is processed is detected, the processor further extends the certain period of time until the notification to the processor is performed.

5. A processing method of an information processing device having a processor, a memory, and an input/output device which receives a processing starting instruction from the processor, comprising:
checking whether a preceding processing instruction is completed by an interrupt signal from the input/output device, and dispatching the processing start instruction if a value of the preceding processing instruction which has not been completed is less than a predetermined number;
transmitting, by the processor, an the interrupt signal as notification of completion of the processing to the processor after a standby of a certain period of time before a transmission of the interrupt signal as a notification of the completion of processing; and
further extending the certain period of time of standby for transmission of the interrupt signal to the processor when the processing starting instruction is received from the processor during the standby for the certain period of time,
wherein the input/output device receives a plurality of instructions of processing from a plurality of cores of the processor, and the input/output device detects a plurality of the processing starting instructions in response to the plurality of the instructions of processing, and
wherein, in a case where the processing starting instruction of the plurality of the processing starting instructions is detected, the certain period of time until the notification to the processor is performed is further extended.

6. The processing method of the information processing device according to claim 5, wherein the processing starting instruction from the processor is detected by writing in a register inside the input/output device.

7. The processing method of the information processing device according to claim 6, wherein the interrupt signal together with identification information of identifying a plurality of processing completion queues provided in the memory is transmitted.

8. The processing method of the information processing device according to claim 5, wherein, when the interrupt signal notifying the processing completion from the processor is detected, the certain period of time is further extended.

9. An input/output device which receives a processing starting instruction from a processor with a memory, the input/output device configured to:
 transmit an interrupt signal as notification of completion of processing received from the processor;
 standby for a certain period of time before transmission of the interrupt signal as notification completion of the processing to the first processor; and
 further extends the certain period of time of standby for transmission of the interrupt signal to the processor when receiving the processing starting instruction from the processor during the standby for the certain period of time,
 wherein the input/output device detects a plurality of the processing starting instructions in response to instructions from a plurality of the processors, and
 wherein, in a case where the processing starting instruction is detected, the processor further extends the certain period of time until the notification to the processor is performed.

10. The input/output device according to claim 9, wherein the processing starting instruction from the processor is detected by writing in a register inside the input/output device.

* * * * *